US006961163B2

(12) United States Patent

Takakubo

(10) Patent No.: US 6,961,163 B2

(45) Date of Patent: Nov. 1, 2005

(54) SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 208 days.

(21) Appl. No.: 10/322,524

(22) Filed: Dec. 19, 2002

(65) Prior Publication Data

US 2003/0183747 A1 Oct. 2, 2003

(30) Foreign Application Priority Data

Dec. 20, 2001 (JP) ....................................... 2001-388364

(51) Int. Cl.[7] ................................................ G02B 26/08

(52) U.S. Cl. ........................ 359/204; 359/207; 359/216

(58) Field of Search ......................... 359/204, 206–207, 359/216–219, 662, 718

(56) References Cited

U.S. PATENT DOCUMENTS 5,251,055 A * 10/1993 Koide ........................ 359/216
6,317,245 B1 11/2001 Hama et al.
6,392,772 B1 5/2002 Hama et al.
6,392,773 B1 5/2002 Hama et al.
6,396,615 B1 5/2002 Hama et al.
6,717,705 B2 * 4/2004 Takakubo .................. 359/207
6,853,470 B2 * 2/2005 Takakubo .................. 359/204

* cited by examiner

*Primary Examiner*—James Phan
(74) *Attorney, Agent, or Firm*—Greenblum & Bernstein, P.L.C.

(57) ABSTRACT

A scanning optical system includes a light source that emits a plurality of beams, a polygonal mirror that deflects the plurality of beams emitted by the light source to scan within a predetermined angular range, and an imaging optical system that converges the plurality of beams on a plurality of surfaces to be scanned, respectively. The imaging optical system includes a scanning lens and a plurality of compensation lenses located between the scanning lens and a plurality of surfaces to be scanned. The plurality of beams passed through the scanning lens are incident on the plurality of compensation lenses, respectively. Each of the plurality of compensation lenses having an anamorphic surface, shapes of which in a main scanning direction are substantially the same with respect to each other.

11 Claims, 8 Drawing Sheets

100
10
11
12
13
20
20a
30
31
32
40
41
51
52
53
54
61
62
63
64
Ax
L1
L2
L3
L4

SCANNING OPTICAL SYSTEM

BACKGROUND OF THE INVENTION

The present invention relates to a scanning optical system, and more particularly to a scanning optical system employed in a tandem type color laser printer or the like, for scanning a plurality of beams simultaneously.

Conventionally, a tandem type color laser printer has been known. The tandem type color laser printer typically has four photoconductive drums corresponding to four colors of Y (yellow), M (magenta), C (cyan) and B (black). In such a printer, a recording sheet is fed in one direction, and images of respective color components are transferred on the recording sheet sequentially, to form a color image. A scanning optical system for this type of color printer, four laser diodes corresponding to the four colors are provided. Four laser beams emitted by the four laser diodes are deflected by a single common polygonal mirror. The deflected beams are incident on a common fθ lens, which converges the beams on the photoconductive drums, respectively. Typically, compensation lenses that compensate for curvature of field are provided in the vicinity of respective photoconductive drums.

With the above configuration, each of the beam spots formed on the respective photoconductive drums scans as the polygonal mirror rotates. At the same time, the photoconductive drums are rotated. By ON-OFF modulating the beams while they scan on the photoconductive drums, two-dimensional latent images are formed on the photoconductive drums, respectively. The latent images are developed by applying toners of respective colors, and then transfer the developed images on the recording sheet, a color image is formed, and fixed.

In this specification, a main scanning direction and an auxiliary scanning direction will be referred to as follows. With the optical paths on the downstream side of the polygonal mirror being considered to be developed, a direction in which the beam spot scans (moves) on the photoconductive drum (a surface to be scanned) will be referred to as the main scanning direction, and a direction parallel with a rotation axis of the polygonal mirror (i.e., a direction perpendicular to the main scanning direction and on a plane including the optical axis of the scanning lens) will be referred to as the auxiliary scanning direction. Shape and/or power of each element will be described with reference to the main and auxiliary scanning directions on the photoconductive drum.

When a single polygonal mirror is used for deflecting a plurality of beams, by differentiating incident angles of the beams with respect to the polygonal mirror in the auxiliary scanning direction, it becomes possible that all the beams are incident on substantially the same point on the polygonal mirror. With such a configuration, the thickness of the polygonal mirror can be reduced, which lowering manufacturing costs of the polygonal mirror.

When a beam incident on the polygonal mirror has a certain incident angle, the bows of the scanning lines corresponding to the beams have different shapes. In the tandem type color laser beam printer, if the scanning lines have different shapes, color shift occurs in the finally obtained color image. Therefore, it is very important to have similarity in the shapes of the bows.

In the conventional scanning optical system, however, for the beams incident on different incident angles, different compensation lenses for compensating the curvature of field are used. Such lenses are designed so as provide optimum performances to compensate for the curvature of field with respect to the beam passing therethrough. Regarding bows, the scanning optical system may be designed so that the bows are minimized. However, if bows appear due to, for example, assembling errors or the like, since the compensation lenses are not designed to compensate for the bows, the shapes of the bows may be different from each other.

Even if the bows occur due the assembling error or the like, if they have the same shapes, by rotating each compensation lens about an axis extending in the main scanning direction, it is possible to make effects of the bows on the corresponding images identical. If this can be done, even if the bows remain, by appropriately adjusting image signal, the effects of the bows can be removed. However, in the conventional tandem type color laser printer, the shape of bows are different from each other, and therefore, even if the compensation lens for the curvature of field is rotated, the shapes of the bows cannot be made identical.

SUMMARY OF THE INVENTION

The present invention is advantageous in that, even the above-described bows are generated, the shapes thereof can be made identical with respect to a plurality of beams incident on a polygonal mirror at different incident angles.

According to an aspect of the invention, there is provided a scanning optical system, which includes a light source that emits a plurality of beams, a polygonal mirror that deflects the plurality of beams emitted by the light source to scan within a predetermined angular range, and an imaging optical system that converges the plurality of beams on a plurality of surfaces to be scanned, respectively. The imaging optical system includes a scanning lens and a plurality of compensation lenses located between the scanning lens and a plurality of surfaces to be scanned. The plurality of beams passed through the scanning lens are incident on the plurality of compensation lenses, respectively. Each of the plurality of compensation lenses having an anamorphic surface, shapes of which in a main scanning direction are substantially the same with respect to each other.

With this configuration, bows of scanning lines respectively formed by the plurality of beams have substantially the same shapes. Therefore, it becomes possible to suppress the color shift in the color printer.

Optionally, the anamorphic surface of each of the compensation lenses may be asymmetrical with respect to a plane that is perpendicular to an auxiliary scanning direction and includes a center of the anamorphic surface.

In a particular case, the anamorphic surface formed on the compensation lens is a two-dimensional polynomial aspherical surface expressed by a two-dimensional polynomial which represents a SAG amount with respect to a plane tangential to the anamorphic surface including the center thereof and perpendicular to the optical axis of the scanning lens as a function of distances in the main scanning direction and in the auxiliary scanning direction with respect to the center of the anamorphic surface.

According to embodiments, the anamorphic lens of the compensation lens satisfies a condition (n being an integer greater than one):

$$|\Delta X_{n-1}(Y)| \leqq 50\Delta p,$$

where, $X(Y)$ is a SAG amount at a point located at distance Y in the main scanning direction with respect to the center of the anamorphic surface, $\Delta X_{n-1}(Y)$ is a difference of SAG amounts of compensation lenses having different shapes defined by equation:

$$\Delta X_{n-1}(Y) = X_n(Y) - X_{n-1}(Y), \text{ and}$$

$\Delta p$ is an allowance of the difference of bows between scanning lines on the different surfaces to be scanned.

According to embodiments, the anamorphic lens of the compensation lens satisfies a condition (n being an integer greater than one):

$$|\Delta X_{n-1}(Y)| \leqq 0.2 \text{ (unit: mm)},$$

wherein,

X(Y) is a SAG amount at a point located at distance Y in the main scanning direction with respect to the center of the anamorphic surface, and $\Delta X_{n-1}(Y)$ is a difference of SAG amounts of compensation lenses having different shapes defined by equation:

$$\Delta X_{n-1}(Y) = X_n(Y) - X_{n-1}(Y).$$

In a particular case, each of the plurality of compensation lenses consists of a single plastic lens.

Optionally, one surface of the scanning lens may be formed as an anamorphic aspherical surface whose cross sectional shape in the main scanning direction is defined as a function of a distance from the optical axis of the scanning lens, a cross sectional shape of the anamorphic aspherical surface in the auxiliary scanning direction being an arc whose curvature is defined, independently of the shape in the main scanning direction, as a function of a distance from the optical axis in the main scanning direction.

Further, the plurality of beams may be incident, within a plane extending in the auxiliary scanning direction, on the polygonal mirror such that incident angles of the plurality of beams having the same absolute values and different signs, the plurality of compensation lenses being arranged optically symmetrically with respect to a line extending the optical axis of the scanning lens.

BRIEF DESCRIPTION OF THE ACCOMPANYING DRAWINGS

DETAILED DESCRIPTION OF THE EMBODIMENTS

Hereinafter, embodiments of the invention will be described with reference to accompanying drawings.

Figures 1A, 1B:
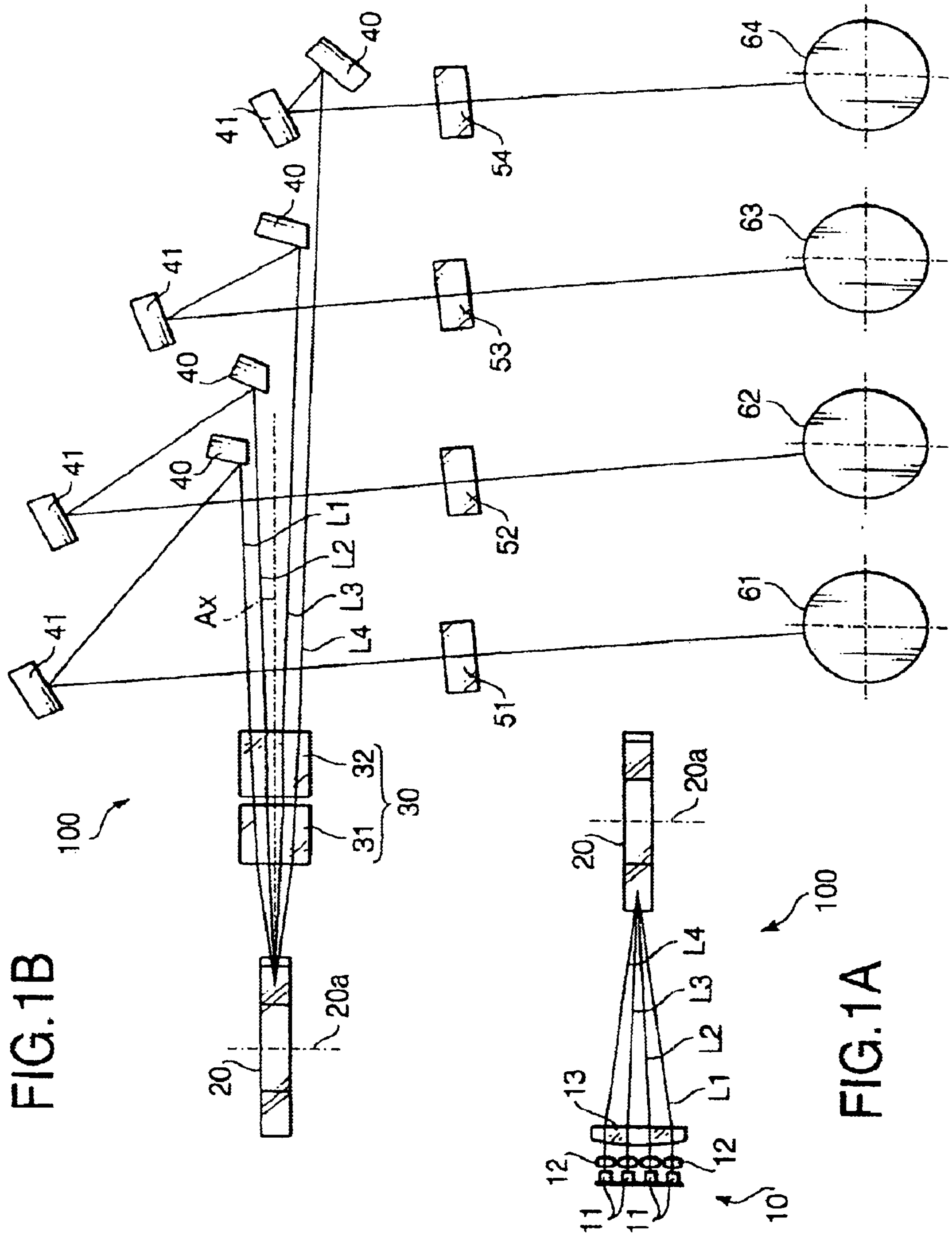
FIG. 1A shows a side view (i.e., a view along the main scanning direction) of main elements of a scanning optical system, on an upstream side of a polygonal mirror, to which the present invention is applicable.
FIG. 1B shows a side view of main elements of the scanning optical system, on a downstream side of the polygonal mirror.

FIG. 1A shows a side view of main elements of a scanning optical system 100, on an upstream side of a polygonal mirror 20, to which the present invention is applicable, and FIG. 1B shows a side view of main elements of the scanning optical system 100, on a downstream side of the polygonal mirror 20.

As shown in FIG. 1A, the scanning optical system 100 includes a light source 10. The light source 10 has four laser diodes 11, and four collimating lens 12 which collimates the laser beams emitted by the laser diodes 11, respectively. The laser diodes 11 are aligned in an auxiliary scanning direction, which is an up-and-down direction in FIG. 1A, and is parallel with a plane of FIG. 1A.

Each of the four laser beams L1–L4 collimated by the respective collimating lenses 12 is converged in the auxiliary scanning direction with the power of a cylindrical lens 13. Further, the four beams L1–L4 are deflected by a prismatic effect of the cylindrical lens, and incident on a substantially same position on the polygonal mirror 20. Since each of the beams L1–L4 is converged only in the auxiliary scanning direction, each beam forms a line-shaped image on a predetermined plane in the vicinity of the polygonal mirror 20. With this configuration, the thickness of the polygonal mirror 20 can be reduced.

Incident angles of the outer beams (uppermost and lowermost beams) L4 and L1 are ±βout, and incident angles of the inner beams (beams between the uppermost and lowermost beams) L3 and L2 are ±βin. In other words, the incident angles of two beams L1 and L2 have the same absolute values and opposite signs with respect to the incident angles of the other two beams L4 and L3.

The four laser beams L1–L4 are deflected by the polygonal mirror 20 simultaneously, which rotates about a rotational axis 20*a*. The deflected four laser beams L1–L4 proceeds at different angles in the auxiliary scanning direction, and are incident on a scanning lens 30 consisting of a first lens 31 and a second lens 32. The laser beams L1–L4 passed through the scanning lens 30 reflected pairs of mirrors 40 and 41, respectively, and incident on photoconductive drums 61–64 via compensating lenses 51–54, respectively, to form beam spots on the photoconductive drums 61–64. The compensating lenses 51–54 are lenses for compensating for curvature of field.

As the polygonal mirror 20 rotates about the rotational axis 20*a*, the beam spots formed on the photoconductive drums 61–64 moves in the main scanning direction. That is, four scanning lines (i.e., loci of the moving beam spots) are simultaneously formed on the photoconductive drums 61–64 by rotating the polygonal mirror 20.

It should be noted that the cylindrical lens 13 functions as an anamorphic optical elements for converging the laser beams emitted by the light source in the auxiliary scanning direction, and the scanning lens 30 and compensation lenses 51–54 function as an imaging optical system that converges the beams deflected by the polygonal mirror 20 to form scanning beam spots on the surfaces to be scanned (i.e., surfaces of the photoconductive drums 61–64 ).

One surface of the scanning lens 30, which is a part of the imaging optical system, is formed to be an anamorphic aspherical surface. According to the embodiment, a cross sectional shape of the anamorphic aspherical surface in the main scanning direction is defined as a function of a distance, in the main scanning direction, from the optical axis Ax of the scanning lens 30, and curvature in the auxiliary scanning direction is defined as a function of a distance, in the main scanning direction, from the optical axis Ax of the scanning lens 30. The anamorphic surface of the scanning lens 30 is configured such that the, shape in the auxiliary scanning direction is an arc, and the curvature thereof in the auxiliary scanning direction is smaller at portions farther, in the main scanning direction, from the optical axis. The shape of the anamorphic aspherical surface is symmetrical with respect to a boundary extending in the main scanning direction passing the optical axis.

Further, one surface of each of the compensation lenses 51–54 is an anamorphic surface. According to the embodiment, the shapes of the anamorphic surfaces of the compensation lenses 51–54 in the main scanning direction are substantially the same. Specifically, the anamorphic surfaces of the compensation lenses 51–54 are designed to satisfy a condition (n being an integer greater than one):

$$|\Delta X_{n-1}(Y)|\leqq 50\Delta p,$$

where, X(Y) is a SAG amount at a point located at distance Y in the main scanning direction with respect to the center of the anamorphic surface, $\Delta X_{n-1}(Y)$ is a difference of SAG amounts of compensation lenses having different shapes defined by equation:

$$\Delta X_{n-1}(Y)=X_n(Y)-X_{n-1}(Y)$$

and, Δp is an allowance of the difference of bows between scanning lines on the different surfaces to be scanned.

The difference of the SAG amounts and the difference of the bows have a proportional relationship. Further, in accordance with the design specification described later, when the difference of the SAG amount is 2.5 mm, the difference of the bows (i.e., the difference of the curved amounts) is 0.05 mm. Thus, a proportional factor is calculated to be 50. Therefore, in such a case, if the condition indicated above is satisfied (i.e., if the maximum value of the difference of the SAG amounts is equal to or less than the allowance Δp of the curved amounts (i.e., bows), the shapes of the bows become substantially identical with respect to each other.

If the allowance Δp is set to one tenth of a beam spot size, when a resolution of an image is 600 dpi, the beam spot size is calculated to be 0.0423 mm, and the allowance Δp is calculated to be 0.00423 mm. Therefore, 50×Δp is approximately 0.2 mm. In this case, the condition above can be rewritten such that;

$$|\Delta X_{n-1}(Y)|\leqq 0.2$$

where unit is mm.

The anamorphic surface of the compensation lenses 51–54 are configured such that inclination in the auxiliary direction varies in accordance with a position in the main scanning direction, and asymmetrical with respect to a plane perpendicular to the auxiliary scanning direction and including the center of the surface. The aspherical surface is a two-dimensional polynomial aspherical surface, which can be expressed by a two-dimensional polynomial providing a SAG amount with respect to a plane including the center of the surface and perpendicular to the optical axis of the scanning lens as a function of distances in the main and auxiliary scanning directions. The shape of the anamorphic surface is symmetrical with respect to the boundary in the auxiliary, scanning direction passing the center of the aspherical surface. The inclination of the two-dimensional polynomial aspherical surface in the auxiliary scanning direction is configured to increase at portions farther from the center of the aspherical surface.

The compensation lenses 51 and 54, on which the outer beams L1 and L4 are incident, have the same lens, and arranged such that one is rotated, with respect to the other, by 180 degrees about the optical axis (which is the optical axis of scanning lens 30 when the reflection surfaces are developed). The compensation lenses 52 and 53, on which the inner beams L2 and L3 are incident, are the same lens, and one is rotated with respect to the other by 180 degrees about the optical axis. It should be noted that, since the outer beams and inner beams form different angles with respect to the optical axis, the compensation lenses 51 and 54 have different characteristics from the compensation lenses 52 and 53. Thus, two kinds of compensation lenses are employed. It is further noted that the compensation lenses 51 and 54 are different from compensation lenses 52 and 53 only by the two-dimensional polynomial aspherical surfaces, and the other surface have the same shape.

Hereinafter, four concrete embodiments of the above-described tandem scanning optical systems will be described.

In the description below, the mirrors 41 and 42 are omitted and description is provided by developing the optical paths for the sake of brevity of explanation.

First Embodiment

Figure 2:
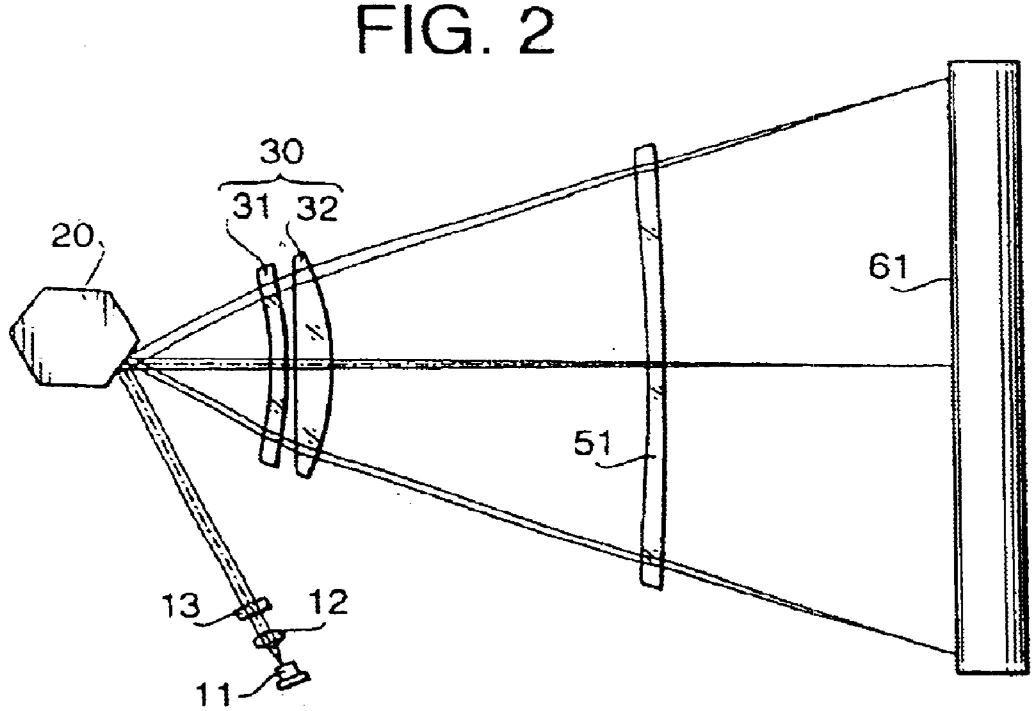
FIG. 2 is a top view (i.e., a view along a direction parallel with a rotational axis of a polygonal mirror) of the scanning optical system showing optical system for outer beams according to a first embodiment of the invention.

FIG. 2 is a top view of the scanning optical system showing optical system for outer beams according to a first embodiment of the invention. The shapes of the lens in the main scanning direction of the optical systems for the outer beams and those for the inner beams are substantially the same. Therefore, in FIG. 2, optical system for the outer beam L1 is indicated. According to the first embodiment, the scanning lens 30 consists of the first lens 31 and the second lens 32, the first lens 31 being a plastic lens, and the second lens 32 being a glass lens. The compensation lenses 51–54 are plastic lenses.

TABLE 1 shows a structure of the scanning optical system on the photoconductive drum side with respect to the cylindrical lens 13. In the table, ry represents a radius of curvature (unit: mm) in the main scanning direction, rz represents a radius of curvature (unit: mm) in the auxiliary scanning direction which is omitted if the surface is rotationally symmetrical, d represents a distance between adjoining surfaces along the optical axis (unit: mm), n represents a refractive index at a wavelength of 780 nm, DECZ represents a displacement (unit: mm) of each surface in the auxiliary scanning direction with respect to the optical axis of the scanning lens 30. The incident angle represents the angle formed by the central axis of each beam with respect to a normal to a reflection surface thereof in the auxiliary scanning direction (i.e., an angel projected onto a plane perpendicular to the main scanning direction).

TABLE 1

FOCAL LENGTH 200 mm,
SCANNING WIDTH 216 mm,
DESIGN WAVELENGTH 780 nm

| | | | | | |
|---|---|---|---|---|---|
| INCIDENT ANGLE | (MAIN SCANNING DIRECTION) | | −65.0° | | |
| | (AUX. SCANNING DIRECTION) | OUTER BEAMS | 2.76°, | INNER BEAMS | 0.92° |

| No | $r_y$ | $r_z$ | d | n | DECZ | ELEMENTS |
|---|---|---|---|---|---|---|
| 1 | ∞ | −51.08 | 4.00 | 1.51072 | 0.00 | CYLINDRI- |
| 2 | ∞ | — | 97.00 | | | CAL LENS |
| 3 | ∞ | — | 48.50 | | 0.00 | POLYGONAL MIRROR |
| 4 | −100.00 | — | 5.00 | 1.48617 | 0.00 | FIRST |
| 5 | −100.00 | −100.00 | 2.50 | | | LENS 31 |
| 6 | ∞ | — | 11.50 | 1.51072 | 0.00 | SECOND |
| 7 | −100.00 | — | 102.50 | | | LENS 32 |
| 8 | −592.00 | — | 5.00 | 1.48617 | 6.00 | COMPENSA- |
| 9 | −1800.00 | — | 91.58 | | | TION LENS 51 |
| 10 | ∞ | — | 0.00 | | 6.00 | PHOTO-CON-DUCTIVE DRUM 61 |
| 11 | −592.80 | — | 5.00 | 1.48617 | 2.50 | COMPENSA- |
| 12 | −1800.00 | — | 91.88 | | | TION LENS 52 |
| 13 | ∞ | — | 0.00 | | 2.08 | PHOTO-CON-DUCTIVE DRUM 62 |

In TABLE 1, surface #1 is a cylindrical surface, surfaces #2 and #3 are planar surfaces, surface #4 is a rotationally symmetrical aspherical surface, surface #5 is an anamorphic aspherical surface, surface #6 is a planar surface, surface #7 is a spherical surface, surfaces #8 and #11 are two-dimensional polynomial aspherical surfaces, and surfaces #9 and #12 are spherical surfaces.

The rotationally symmetrical aspherical surface is represented by a SAG amount X(h) representing a distance from a tangential plane which is tangent to the aspherical surface at the optical axis thereof to a point on the aspherical surface:

$$X(h) = \frac{Ch^2}{1 + \sqrt{1 - (1 + \kappa)C^2 h^2}} + A_4 h^4 + A_6 h^6 + \ldots$$

where, X(h) a SAG amount at a point, on the aspherical surface, at a distance h from the optical axis thereof, C represents a curvature (C=1/r) and r is a radius of the curvature of the aspherical surface at the optical axis position, κ is a conical coefficient, A4 and A6 are fourth and sixth aspherical coefficients. Terms of eight order and greater are zero and are omitted. Values of the coefficients are indicated in TABLE 2.

TABLE 2

SURFACE #4
ROTATIONALLY SYMMETRICAL ASPHERICAL SURFACE

| K | 0.00 |
|---|---|
| $A_4$ | $1.58 \times 10^{-06}$ |
| $A_6$ | $2.39 \times 10^{-10}$ |

The anamorphic aspherical surface is expressed by the following expression.

$$X(y) = \frac{Cy^2}{1 + \sqrt{1 - (1 + \kappa)C^2 y^2}} + \sum_{n=1} AM_n y^n$$

$$Cz(y) = C_{z0} + \sum_{n=1} AS_n y^n$$

where, X(y) represents a distance (i.e., the SAG amount) from a line extending in the main scanning direction and is tangential to the anamorphic aspherical surface, y is a distance from a point of the surface in the main scanning direction to the tangential line and C represent a curvature (=1/r) at an optical axis. Further, Cz(y) is a curvature of an arc contacting the curve and extending in the auxiliary scanning direction.

In the equations, κ is a conical coefficient, AMn is a n-th order aspherical coefficient defining curvature in the main scanning direction, Czo is a curvature (1/rz) in the auxiliary scanning direction, ASn represents an n-th order aspherical coefficient defining the curvature of the surface in the auxiliary scanning direction. TABLE 3 indicates the numerical values of the coefficients defining surface #5.

TABLE 3

SURFACE #5
ANAMOPHIC ASPHERICAL SURFACE

| K | 0.00 | | |
|---|---|---|---|
| $AM_1$ | 0.00 | $AS_1$ | $6.44 \times 10^{-06}$ |
| $AM_2$ | $-1.49 \times 10^{-05}$ | $AS_2$ | $7.57 \times 10^{-06}$ |
| $AM_3$ | 0.00 | $AS_3$ | $1.80 \times 10^{-08}$ |
| $AM_4$ | $1.53 \times 10^{-06}$ | $AS_4$ | $-1.71 \times 10^{-09}$ |
| $AM_5$ | 0.00 | $AS_5$ | $-1.34 \times 10^{-11}$ |
| $AM_6$ | $1.86 \times 10^{-10}$ | $AS_6$ | $1.01 \times 10^{-12}$ |

The two-dimensional polynomial aspherical surfaces are expressed by the following equation.

$$X(y, z) = \frac{Ch^2}{1 + \sqrt{1 - (1 + \kappa)C^2 h^2}} + \sum_{n=0} \sum_{m=0} B_{mn} y^m z^n$$

where, y represents a distance in the main scanning direction, z represents a distance in the auxiliary scanning direction, X(y,z) represents the SAG amount representing a distance from a tangential plane which is tangential to the two-dimensional polynomial aspherical surface at the center thereof, C represents a curvature of the surface in the main scanning direction at the center of the surface ($C=1/r_y$), κ represents a conical coefficient, h represents a distance from the center of the surface ($h=(y^2+z^2)^{1/2}$), $B_{mn}$ represents a coefficient (m-th order in the main scanning direction, and n-th order in the auxiliary scanning direction).

The two-dimensional polynomial is a general form representing a rotationally symmetrical surface. If Bmn for n equals odd number are set to values other than zero, the shape of the surface defined by the polynomial is asymmetrical with respect to the plane including the center of the surface and perpendicular to the auxiliary scanning direction.

Concrete values of the coefficients defining the two-dimensional polynomial surface formed on the compensation lens 51 and compensation lens 52 are indicated in TABLES 4 and 5, respectively.

TABLE 4

| SURFACE #8<br>TWO-DIMENSIONAL POLYNOMIAL ASPHERICAL SURFACE<br>(FOR OUTER BEAMS) | | | | | |
|---|---|---|---|---|---|
| $B_{mn}$ | n = 0 | n = 1 | n = 2 | n = 3 | n = 4 |
| m = 0 | — | $6.252 \times 10^{-02}$ | $1.654 \times 10^{-02}$ | $-3.163 \times 10^{-05}$ | $-4.542 \times 10^{-08}$ |
| m = 2 | $-2.529 \times 10^{-05}$ | $-5.921 \times 10^{-07}$ | $-2.926 \times 10^{-07}$ | $3.867 \times 10^{-10}$ | $6.112 \times 10^{-11}$ |
| m = 4 | $8.247 \times 10^{-08}$ | $-1.440 \times 10^{-10}$ | $-8.264 \times 10^{-12}$ | $-4.133 \times 10^{-13}$ | $4.668 \times 10^{-15}$ |
| m = 6 | $-5.177 \times 10^{-12}$ | $9.335 \times 10^{-15}$ | $1.558 \times 10^{-15}$ | $-4.333 \times 10^{-17}$ | 0.000 |
| m = 8 | $2.565 \times 10^{-16}$ | 0.000 | 0.000 | 0.000 | 0.000 |

TABLE 5

| SURFACE #11<br>TWO-DIMENSIONAL POLYNOMIAL ASPHERICAL SURFACE<br>(FOR INNER BEAMS) | | | | | |
|---|---|---|---|---|---|
| $B_{mn}$ | n = 0 | n = 1 | n = 2 | n = 3 | n = 4 |
| m = 0 | — | $3.523 \times 10^{-02}$ | $1.658 \times 10^{-02}$ | $-2.044 \times 10^{-05}$ | $-3.797 \times 10^{-08}$ |
| m = 2 | $-2.692 \times 10^{-05}$ | $-4.567 \times 10^{-07}$ | $-2.933 \times 10^{-07}$ | $2.130 \times 10^{-09}$ | $7.696 \times 10^{-12}$ |
| m = 4 | $8.239 \times 10^{-08}$ | $-6.120 \times 10^{-11}$ | $-1.323 \times 10^{-11}$ | $-1.552 \times 10^{-13}$ | $1.316 \times 10^{-15}$ |
| m = 6 | $-4.884 \times 10^{-12}$ | $4.911 \times 10^{-15}$ | $1.823 \times 10^{-16}$ | $-6.438 \times 10^{-17}$ | 0.000 |
| m = 8 | $2.314 \times 10^{-16}$ | 0.000 | 0.000 | 0.000 | 0.000 |

Figure 3:
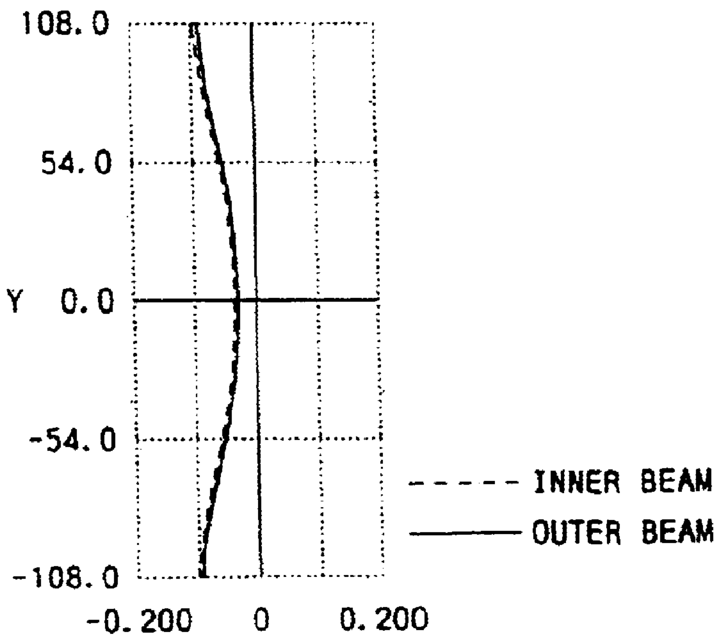
FIG. 3 is a graph showing bows according to the first embodiment of the invention when a compensation lens is inclined by one degree.

FIG. 3 is a graph showing bows according to the first embodiment of the invention when each of the compensation lenses 51–54 is rotated by one degree about its rotation axis extending in the main scanning direction. In the graph, solid line represents the bow corresponding to the outer beam L1 and broken line represents the bow corresponding to the inner beam L2. The vertical axis of the graph indicated the scanning position in the main scanning direction (unit: mm) and the horizontal line of the graph indicates the amount of bow (unit: mm). As indicated in FIG. 3, according to the embodiment, the bows generated by the optical system for the outer beam L1 and that for the inner beam are substantially the same.

Second Embodiment

Figure 4:
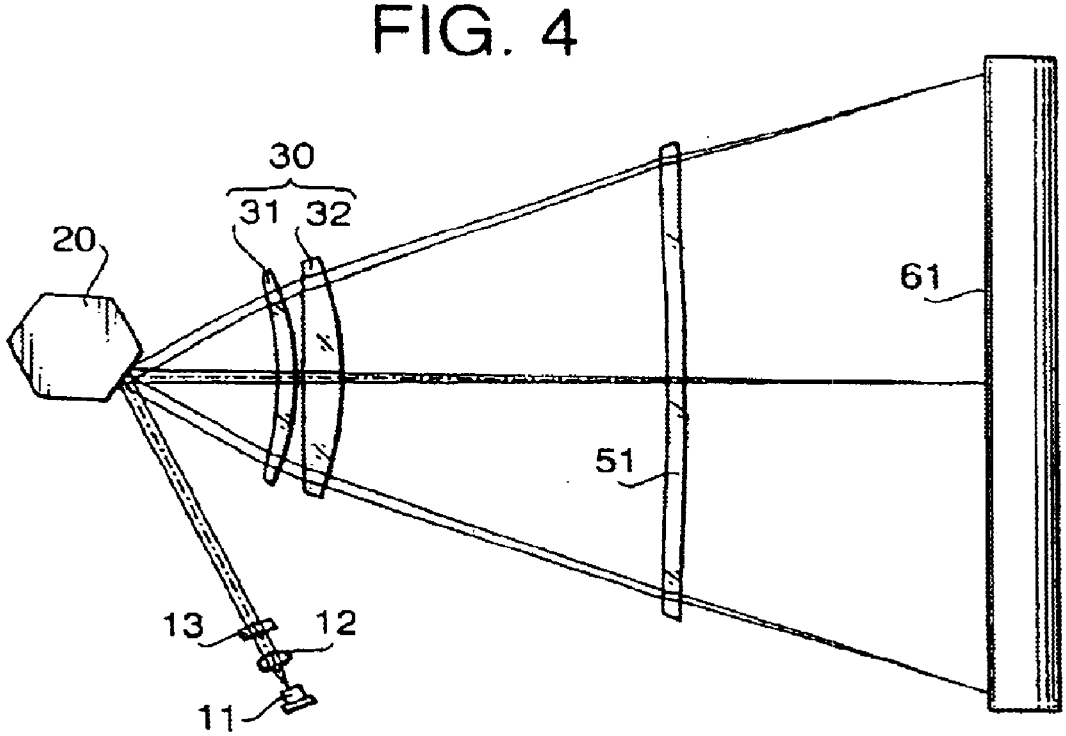
FIG. 4 is a top view of the scanning optical system showing optical system for outer beams according to a second embodiment of the invention.

FIG. 4 is a top view of the scanning optical system showing optical system for outer beams according to a second embodiment of the invention.

In the scanning optical system according to the second embodiment, the scanning lens 30 consists of the first and second lenses 31 and 32, and the first and second lenses 31 and 32 and the compensation lenses 51–54 are all made of plastic.

TABLE 6 indicates the numerical structure of the scanning optical system on the polygonal drum side with respect to the cylindrical lens 13.

TABLE 6

FOCAL LENGTH 200 mm,
SCANNING WIDTH 216 mm,
DESIGN WAVELENGTH 780 nm

| | | | | | |
|---|---|---|---|---|---|
| INCIDENT ANGLE | (MAIN SCANNING DIRECTION) | | −65.0° | | |
| | (AUX. SCANNING DIRECTION) | OUTER BEAMS | 2.76°, | INNER BEAMS | 0.92° |

| No | $r_y$ | $r_z$ | d | n | DECZ | ELEMENTS |
|---|---|---|---|---|---|---|
| 1 | ∞ | −51.08 | 4.00 | 1.51072 | 0.00 | CYLINDRICAL LENS |
| 2 | ∞ | — | 97.00 | | | |

TABLE 6-continued

| No | $r_y$ | $r_z$ | d | n | DECZ | ELEMENTS |
|---|---|---|---|---|---|---|
| 3 | ∞ | — | 48.50 | | 0.00 | POLYGONAL MIRROR |
| 4 | −100.00 | — | 5.00 | 1.48617 | 0.00 | FIRST |
| 5 | −100.00 | — | 2.50 | | | LENS 31 |
| 6 | ∞ | — | 11.50 | 1.48617 | 0.00 | SECOND |
| 7 | −100.00 | −100.00 | 102.50 | | | LENS 32 |
| 8 | −653.70 | — | 5.00 | 1.48617 | 6.00 | COMPENSATION |
| 9 | −1800.00 | — | 92.02 | | | LENS 51 |
| 10 | ∞ | — | 0.00 | | 5.55 | PHOTOCONDUCTIVE DRUM 61 |
| 11 | −648.40 | — | 5.00 | 1.48617 | 2.50 | COMPENSATION |
| 12 | −1800.00 | — | 92.07 | | | LENS 52 |
| 13 | ∞ | — | 0.00 | | 1.89 | PHOTOCONDUCTIVE DRUM 62 |

In the second embodiment, surface #1 is a cylindrical surface, surfaces #2 and #3 are planar surfaces, surface #4 is a rotationally symmetrical aspherical surface, surface #5 is a spherical surface, surface #6 is a planar surface, surface #7 is an anamorphic aspherical surface, surfaces #8 and #11 are two-dimensional polynomial aspherical surfaces, and surfaces #9 and #12 are spherical surfaces. Coefficients defining surfaces #4, #7, #8 and #11 are indicated in TABLEs 7, 8, 9 and 10, respectively.

TABLE 7

| SURFACE #4<br>ROTATIONALLY SYMMETRICAL ASPHERICAL SURFACE | |
|---|---|
| K | 0.00 |
| $A_4$ | $1.16 \times 10^{-06}$ |
| $A_6$ | $-1.25 \times 10^{-10}$ |

TABLE 8

| SURFACE #5 ANAMOPHIC ASPHERICAL SURFACE | | | |
|---|---|---|---|
| K | 0.00 | | |
| $AM_1$ | 0.00 | $AS_1$ | $4.64 \times 10^{-06}$ |
| $AM_2$ | $-6.13 \times 10^{-06}$ | $AS_2$ | $2.94 \times 10^{-06}$ |
| $AM_3$ | 0.00 | $AS_3$ | $6.85 \times 10^{-09}$ |
| $AM_4$ | $8.71 \times 10^{-07}$ | $AS_4$ | $-1.32 \times 10^{-09}$ |
| $AM_5$ | 0.00 | $AS_5$ | $-3.56 \times 10^{-12}$ |
| $AM_6$ | $-4.72 \times 10^{-11}$ | $AS_6$ | $-3.34 \times 10^{-13}$ |

TABLE 9

SURFACE #8
TWO-DIMENSIONAL POLYNOMIAL ASPHERICAL SURFACE
(FOR OUTER BEAMS)

| $B_{mn}$ | n = 0 | n = 1 | n = 2 | n = 3 | n = 4 |
|---|---|---|---|---|---|
| m = 0 | — | $7.245 \times 10^{-02}$ | $1.645 \times 10^{-02}$ | $-1.233 \times 10^{-05}$ | $-2.100 \times 10^{-07}$ |
| m = 2 | $-9.708 \times 10^{-06}$ | $-9.270 \times 10^{-07}$ | $-3.044 \times 10^{-07}$ | $-9.591 \times 10^{-10}$ | $-1.773 \times 10^{-11}$ |
| m = 4 | $1.111 \times 10^{-07}$ | $-1.791 \times 10^{-10}$ | $-1.080 \times 10^{-11}$ | $-2.247 \times 10^{-13}$ | $-5.992 \times 10^{-15}$ |
| m = 6 | $-6.350 \times 10^{-12}$ | $1.311 \times 10^{-14}$ | $1.753 \times 10^{-15}$ | $-5.836 \times 10^{-17}$ | $-1.122 \times 10^{-19}$ |
| m = 8 | $2.293 \times 10^{-16}$ | 0.000 | 0.000 | 0.000 | 0.000 |

TABLE 10

SURFACE #11
TWO-DIMENSIONAL POLYNOMIAL ASPHERICAL SURFACE
(FOR INNER BEAMS)

| $B_{mn}$ | n = 0 | n = 1 | n = 2 | n = 3 | n = 4 |
|---|---|---|---|---|---|
| m = 0 | — | $3.940 \times 10^{-02}$ | $1.651 \times 10^{-02}$ | $-1.372 \times 10^{-05}$ | $-1.282 \times 10^{-07}$ |
| m = 2 | $1.912 \times 10^{-06}$ | $-5.986 \times 10^{-07}$ | $-2.982 \times 10^{-07}$ | $2.226 \times 10^{-09}$ | $-1.987 \times 10^{-11}$ |
| m = 4 | $1.116 \times 10^{-07}$ | $-7.569 \times 10^{-11}$ | $1.707 \times 10^{-11}$ | $-1.593 \times 10^{-13}$ | $-8.401 \times 10^{-15}$ |
| m = 6 | $-6.244 \times 10^{-12}$ | $6.436 \times 10^{-15}$ | $2.136 \times 10^{-15}$ | $-5.594 \times 10^{-17}$ | $-1.385 \times 10^{-19}$ |
| m = 8 | $2.158 \times 10^{-16}$ | 0.000 | 0.000 | 0.000 | 0.000 |

Figure 5:
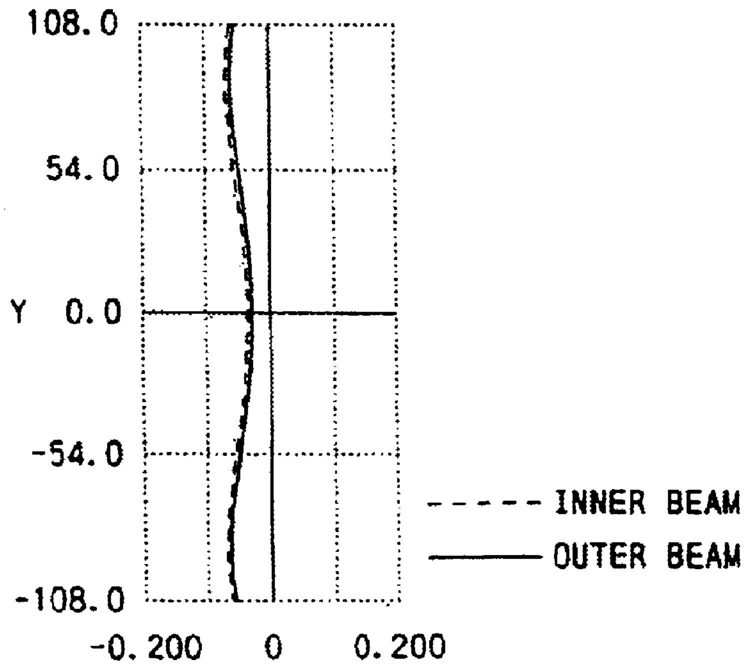
FIG. 5 is a graph showing bows according to the second embodiment of the invention when a compensation lens is inclined by one degree.

FIG. 5 is a graph showing bows according to the second embodiment of the invention when each of the compensation lenses 51–54 is rotated by one degree about its rotation axis extending in the main scanning direction. In the graph, solid line represents the bow corresponding to the outer beam L1 and broken line represents the bow corresponding to the inner beam L2. The vertical axis of the graph indicated the scanning position in the main scanning direction (unit: mm) and the horizontal line of the graph indicates the amount of bow (unit: mm). As indicated in FIG. 5, according to the embodiment, the bows generated by the optical system for the outer beam L1 and that for the inner beam are substantially the same.

Third Embodiment

Figure 6:
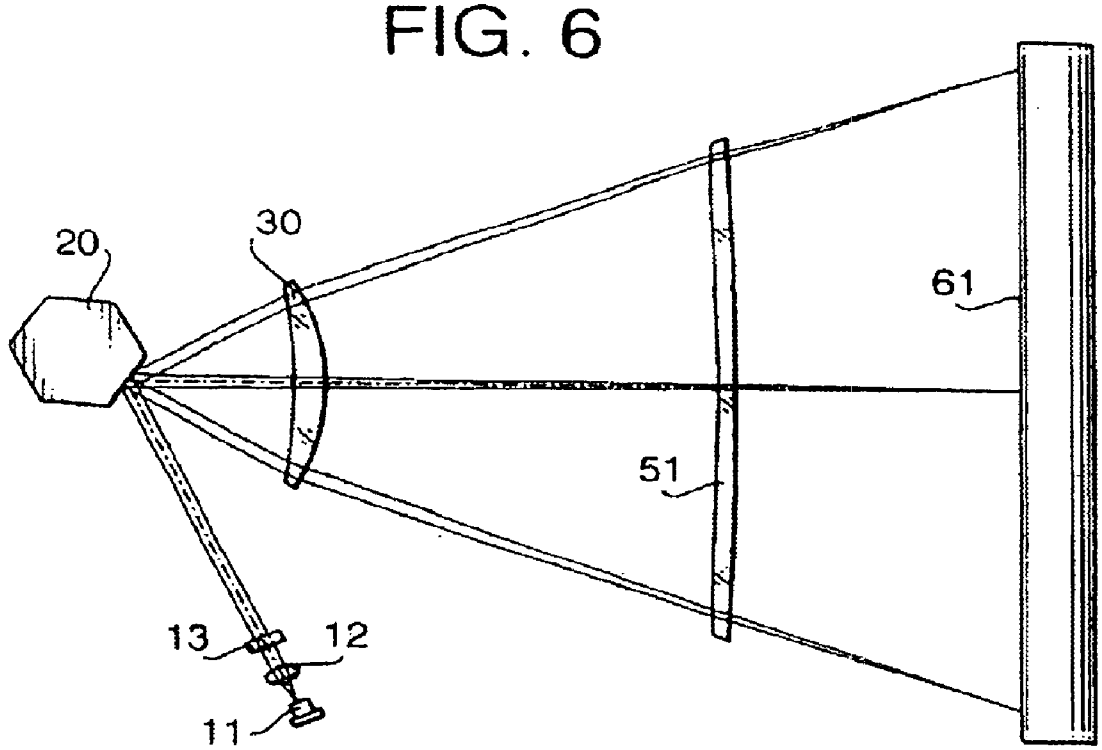
FIG. 6 is a top view of the scanning optical system showing optical system for outer beams according to a third embodiment of the invention.

FIG. 6 is a top view of the scanning optical system showing optical system for outer beams according to a third embodiment of the invention.

In the third embodiment, the scanning lens 30 consists of a single lens, and the scanning lens and the compensation lenses 51–54 are all made of plastic.

TABLE 11 shows a numerical structure of the scanning optical system on the polygonal mirror side with respect to the cylindrical lens 13.

TABLE 11

FOCAL LENGTH 220 mm,
SCANNING WIDTH 216 mm,
DESIGN WAVELENGTH 780 nm

| | | | | | |
|---|---|---|---|---|---|
| INCIDENT ANGLE | (MAIN SCANNING DIRECTION) | | −65.0° | | |
| | (AUX. SCANNING DIRECTION) | OUTER BEAMS | 2.76°, | INNER BEAMS | 0.92° |

| No | $r_y$ | $r_z$ | d | n | DECZ | ELEMENTS |
|---|---|---|---|---|---|---|
| 1 | ∞ | −51.08 | 4.00 | 1.51072 | 0.00 | CYLINDRICAL LENS |
| 2 | ∞ | — | 97.00 | | | |
| 3 | ∞ | — | 48.50 | | 0.00 | POLYGONAL MIRROR |

TABLE 11-continued

| | | | | | | |
|---|---|---|---|---|---|---|
| 4 | −197.60 | — | 9.00 | 1.48617 | 0.00 | SCANNING LENS 30 |
| 5 | −64.60 | −35.00 | 112.50 | | | |
| 6 | −740.00 | — | 5.00 | 1.48617 | 7.00 | COMPENSATION LENS 51 |
| 7 | −1800.00 | — | 83.09 | | | |
| 8 | ∞ | — | 0.00 | | 7.00 | PHOTO-CONDUCTIVE DRUM 61 |
| 9 | −700.00 | — | 5.00 | 1.48617 | 2.50 | COMPENSATION LENS 52 |
| 10 | −1800.00 | — | 83.38 | | | |
| 11 | ∞ | — | 0.00 | | 2.40 | PHOTO-CONDUCTIVE DRUM 62 |

In the third embodiment, surface #1 is a cylindrical surface, surfaces #2 and #3 are planar surfaces, surface #4 is a rotationally symmetrical aspherical surface, surface #5 is an anamorphic aspherical surface, surfaces #6 and #9 are two-dimensional polynomial aspherical surfaces, surface #8 is a planar surface, and surfaces #7 and #10 are spherical surfaces. Coefficients defining surfaces #4, #5, #6 and #9 are indicated in TABLEs 12, 13, 14 and 15, respectively.

TABLE 12

| SURFACE #4 ROTATIONALLY SYMMETRICAL ASPHERICAL SURFACE | |
|---|---|
| K | 0.00 |
| $A_4$ | $2.91 \times 10^{-07}$ |
| $A_6$ | $-3.22 \times 10^{-11}$ |

TABLE 13

| SURFACE #5 ANAMOPHIC ASPHERICAL SURFACE | | | |
|---|---|---|---|
| K | 0.00 | | |
| $AM_1$ | 0.00 | $AS_1$ | $6.03 \times 10^{-06}$ |
| $AM_2$ | $1.87 \times 10^{-06}$ | $AS_2$ | $2.76 \times 10^{-06}$ |
| $AM_3$ | 0.00 | $AS_3$ | $1.73 \times 10^{-08}$ |
| $AM_4$ | $3.98 \times 10^{-07}$ | $AS_4$ | $-2.46 \times 10^{-09}$ |
| $AM_5$ | 0.00 | $AS_5$ | $-1.20 \times 10^{-11}$ |
| $AM_6$ | $6.56 \times 10^{-11}$ | $AS_6$ | $-2.82 \times 10^{-13}$ |

TABLE 14

SURFACE #6
TWO-DIMENSIONAL POLYNOMIAL ASPHERICAL SURFACE
(FOR OUTER BEAMS)

| $B_{mn}$ | n = 0 | n = 1 | n = 2 | n = 3 | n = 4 |
|---|---|---|---|---|---|
| m = 0 | — | $8.099 \times 10^{-02}$ | $1.802 \times 10^{-02}$ | $-2.337 \times 10^{-07}$ | $-1.050 \times 10^{-06}$ |
| m = 2 | $-2.065 \times 10^{-05}$ | $-1.175 \times 10^{-06}$ | $-4.133 \times 10^{-07}$ | $-3.531 \times 10^{-09}$ | $-3.376 \times 10^{-11}$ |
| m = 4 | $1.030 \times 10^{-07}$ | $-2.103 \times 10^{-10}$ | $6.148 \times 10^{-12}$ | $-1.684 \times 10^{-13}$ | $-8.537 \times 10^{-15}$ |
| m = 6 | $-3.529 \times 10^{-12}$ | $1.506 \times 10^{-14}$ | $4.856 \times 10^{-16}$ | $-5.544 \times 10^{-17}$ | 0.000 |
| m = 8 | $1.972 \times 10^{-17}$ | 0.000 | 0.000 | 0.000 | 0.000 |

TABLE 15

SURFACE #9
TWO-DIMENSIONAL POLYNOMIAL ASPHERICAL SURFACE
(FOR INNER BEAMS)

| $B_{mn}$ | n = 0 | n = 1 | n = 2 | n = 3 | n = 4 |
|---|---|---|---|---|---|
| m = 0 | — | $3.141 \times 10^{-02}$ | $1.810 \times 10^{-02}$ | $-1.507 \times 10^{-05}$ | $-5.554 \times 10^{-07}$ |
| m = 2 | $3.974 \times 10^{-05}$ | $-5.150 \times 10^{-07}$ | $-4.060 \times 10^{-07}$ | $4.618 \times 10^{-10}$ | $-2.608 \times 10^{-11}$ |
| m = 4 | $1.063 \times 10^{-07}$ | $-6.374 \times 10^{-11}$ | $-1.748 \times 10^{-11}$ | $-1.999 \times 10^{-13}$ | $-6.434 \times 10^{-15}$ |
| m = 6 | $-4.358 \times 10^{-12}$ | $4.561 \times 10^{-15}$ | $1.113 \times 10^{-15}$ | $3.912 \times 10^{-17}$ | 0.000 |
| m = 8 | $8.644 \times 10^{-17}$ | 0.000 | 0.000 | 0.000 | 0.000 |

Figure 7:
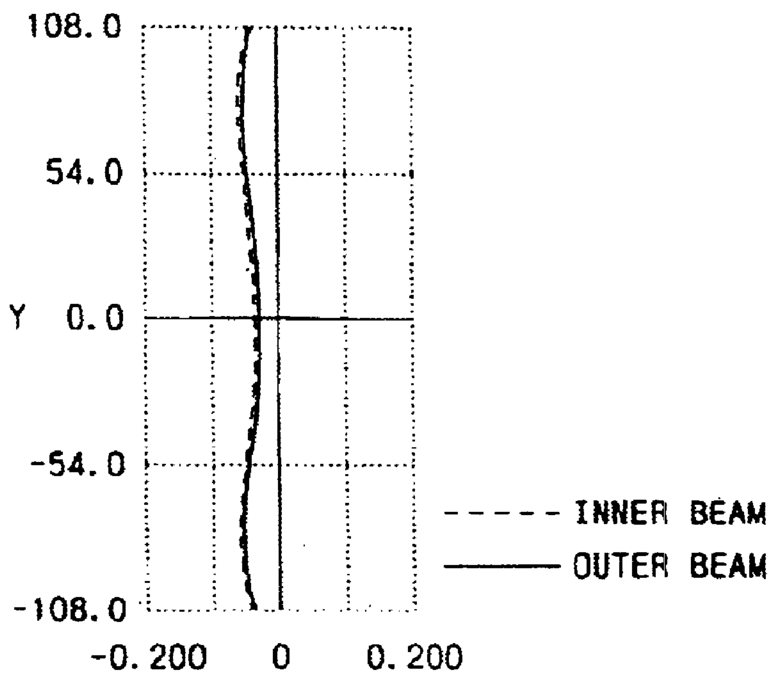
FIG. 7 is a graph showing bows according to the third embodiment of the invention when a compensation lens is inclined by one degree.

FIG. 7 is a graph showing bows according to the third embodiment of the invention when each of the compensation lenses 51–54 is rotated by one degree about its rotation axis extending in the main scanning direction. In the graph, solid line represents the bow corresponding to the outer beam L1 and broken line represents the bow corresponding to the inner beam L2. The vertical axis of the graph indicated the scanning position in the main scanning direction (unit: mm) and the horizontal line of the graph indicates the amount of bow (unit: mm). As indicated in FIG. 7, according to the embodiment, the bows generated by the optical system for the outer beam L1 and that for the inner beam are substantially the same.

Fourth Embodiment

Figure 8:
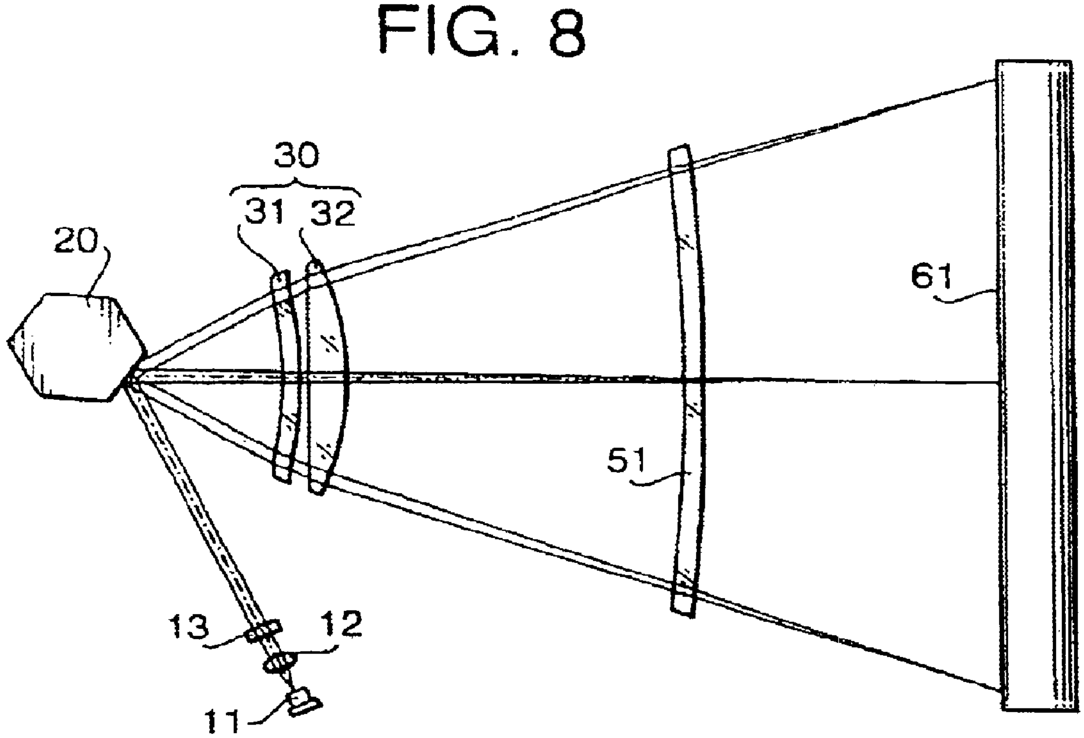
FIG. 8 is a top view of the scanning optical system showing optical system for outer beams according to a fourth embodiment of the invention.

FIG. 8 is a top view of the scanning optical system showing optical system for outer beams according to a fourth embodiment of the invention.

In the scanning optical system according to the fourth embodiment, the scanning lens 30 consists of the first and second lenses 31 and 32. The first lens 31 is a plastic lens, the second lens is a glass lens, and the compensation lenses 51–54 are made of plastic.

TABLE 16 indicates the numerical structure of the scanning optical system according to the fourth embodiment on the polygonal drum side with respect to the cylindrical lens 13.

TABLE 16

FOCAL LENGTH 200 mm, SCANNING WIDTH 216 mm, DESIGN WAVELENGTH 780 nm

| | | | | | |
|---|---|---|---|---|---|
| INCIDENT ANGLE | (MAIN SCANNING DIRECTION) | | −65.0° | | |
| | (AUX. SCANNING DIRECTION) | OUTER BEAMS | 2.76°, | INNER BEAMS | 0.92° |

| No | $r_y$ | $r_z$ | d | n | DECZ | ELEMENTS |
|---|---|---|---|---|---|---|
| 1 | ∞ | −51.08 | 4.00 | 1.51072 | 0.00 | CYLINDRICAL LENS |
| 2 | ∞ | — | 97.00 | | | |
| 3 | ∞ | — | 48.50 | | 0.00 | POLYGONAL MIRROR |
| 4 | −100.00 | — | 5.00 | 1.48617 | 0.00 | FIRST LENS 31 |
| 5 | −100.00 | −100.00 | 2.50 | | | |
| 6 | ∞ | — | 11.50 | 1.51072 | 0.00 | SECOND LENS 32 |
| 7 | −100.00 | — | 102.50 | | | |
| 8 | −612.20 | — | 5.00 | 1.48617 | 6.00 | COMPENSATION LENS 51 |
| 9 | −2000.00 | — | 91.87 | | | |
| 10 | ∞ | — | 0.00 | | 5.32 | PHOTOCONDUCTIVE DRUM 61 |
| 11 | −619.40 | — | 5.00 | 1.48617 | 2.50 | COMPENSATION LENS 52 |
| 12 | −2000.00 | — | 91.78 | | | |
| 13 | ∞ | — | 0.00 | | 2.32 | PHOTOCONDUCTIVE DRUM 62 |

In the fourth embodiment, surface #1 is a cylindrical surface, surfaces #2 and #3 are planar surfaces, surface #4 is a rotationally symmetrical aspherical surface, surface #5 is an anamorphic aspherical surface, surface #6 is a planar surface, surfaces #7, #8 and #11 are spherical surfaces and surfaces #9 and #12 are two-dimensional polynomial aspherical surfaces. Coefficients defining surfaces #4, #5, #9 and #12 are indicated in TABLEs 17, 18, 19 and 20, respectively.

TABLE 17

SURFACE #4
ROTATIONALLY SYMMETRICAL ASPHERICAL SURFACE

| K | 0.00 |
|---|---|
| $A_4$ | $2.00 \times 10^{-06}$ |
| $A_6$ | $1.18 \times 10^{-10}$ |

TABLE 18

SURFACE #5
ANAMOPHIC ASPHERICAL SURFACE

| K | 0.00 | | |
|---|---|---|---|
| $AM_1$ | 0.00 | $AS_1$ | $5.96 \times 10^{-06}$ |
| $AM_2$ | $-1.09 \times 10^{-05}$ | $AS_2$ | $7.34 \times 10^{-06}$ |
| $AM_3$ | 0.00 | $AS_3$ | $1.95 \times 10^{-08}$ |
| $AM_4$ | $1.87 \times 10^{-06}$ | $AS_4$ | $1.73 \times 10^{-09}$ |
| $AM_5$ | 0.00 | $AS_5$ | $-1.45 \times 10^{-11}$ |
| $AM_6$ | $1.07 \times 10^{-10}$ | $AS_6$ | $-7.02 \times 10^{-13}$ |

TABLE 19

SURFACE #9
TWO-DIMENSIONAL POLYNOMIAL ASPHERICAL SURFACE (FOR OUTER BEAMS)

| $B_{mn}$ | n = 0 | n = 1 | n = 2 | n = 3 | n = 4 |
|---|---|---|---|---|---|
| m = 0 | — | $-4.618 \times 10^{-02}$ | $-1.683 \times 10^{-02}$ | $-8.682 \times 10^{-06}$ | $2.190 \times 10^{-07}$ |
| m = 2 | $3.008 \times 10^{-05}$ | $8.414 \times 10^{-07}$ | $3.774 \times 10^{-07}$ | $5.453 \times 10^{-09}$ | $-1.141 \times 10^{-11}$ |
| m = 4 | $-8.511 \times 10^{-08}$ | $-1.012 \times 10^{-10}$ | $-2.645 \times 10^{-11}$ | $6.649 \times 10^{-13}$ | $2.035 \times 10^{-15}$ |
| m = 6 | $5.845 \times 10^{-12}$ | $4.956 \times 10^{-15}$ | $-1.620 \times 10^{-15}$ | $6.486 \times 10^{-17}$ | 0.000 |
| m = 8 | $-3.288 \times 10^{-16}$ | 0.000 | 0.000 | 0.000 | 0.000 |

TABLE 20

SURFACE #12
TWO-DIMENSIONAL POLYNOMIAL
ASPHERICAL SURFACE (FOR INNER BEAMS)

| $B_{mn}$ | n = 0 | n = 1 | n = 2 | n = 3 | n = 4 |
|---|---|---|---|---|---|
| m = 0 | — | $-2.969 \times 10^{-02}$ | $-1.688 \times 10^{-02}$ | $-2.601 \times 10^{-06}$ | $2.039 \times 10^{-07}$ |
| m = 2 | $3.469 \times 10^{-05}$ | $6.150 \times 10^{-07}$ | $3.906 \times 10^{-07}$ | $5.960 \times 10^{-09}$ | $-1.110 \times 10^{-11}$ |
| m = 4 | $-8.347 \times 10^{-08}$ | $-5.460 \times 10^{-11}$ | $-2.541 \times 10^{-11}$ | $4.052 \times 10^{-14}$ | $2.253 \times 10^{-15}$ |
| m = 6 | $5.625 \times 10^{-12}$ | $1.600 \times 10^{-15}$ | $3.308 \times 10^{-16}$ | $-5.140 \times 10^{-17}$ | 0.000 |
| m = 8 | $-3.181 \times 10^{-16}$ | 0.000 | 0.000 | 0.000 | 0.000 |

Figure 9:
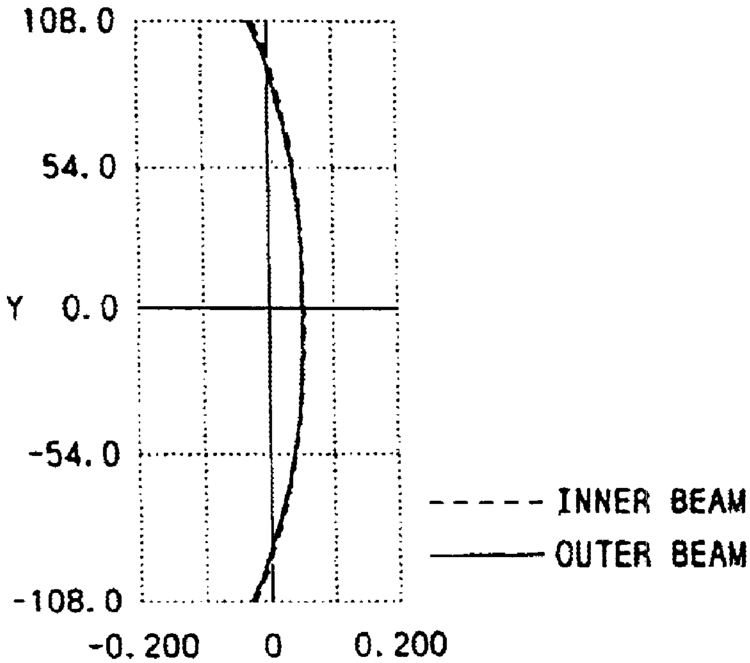
FIG. 9 is a graph showing bows according to the fourth embodiment of the invention when a compensation lens is inclined by one degree.

FIG. 9 is a graph showing bows according to the fourth embodiment of the invention when each of the compensation lenses 51–54 is rotated by one degree about its rotation axis extending in the main scanning direction. In the graph, solid line represents the bow corresponding to the outer beam L1 and broken line represents the bow corresponding to the inner beam L2. The vertical axis of the graph indicated the scanning position in the main scanning direction (unit: mm) and the horizontal line of the graph indicates the amount of bow (unit: mm). As indicated in FIG. 9, according to the embodiment, the bows generated by the optical system for the outer beam L1 and that for the inner beam are substantially the same.

COMPARATIVE EXAMPLE

In the above-described four embodiments, the shapes of the compensation lenses in the main scanning direction are substantially the same.

In view of the fundamental performance of the scanning optical system, i.e., the constant speed of the scanning beams, sufficient compensation for aberrations, and the like, it seems that the shapes in the main scanning direction of the compensation lenses are not necessarily the same. In the following description, such an example, i.e., the shapes of the compensation lenses in the main scanning direction are not the same, is presented as a comparative example, and will be described with reference to one of the embodiments described above.

Specifically, the comparative embodiment are configured such that the compensation lenses 52 and 53 for the inner beams of the third embodiment are modified.

Figure 10:
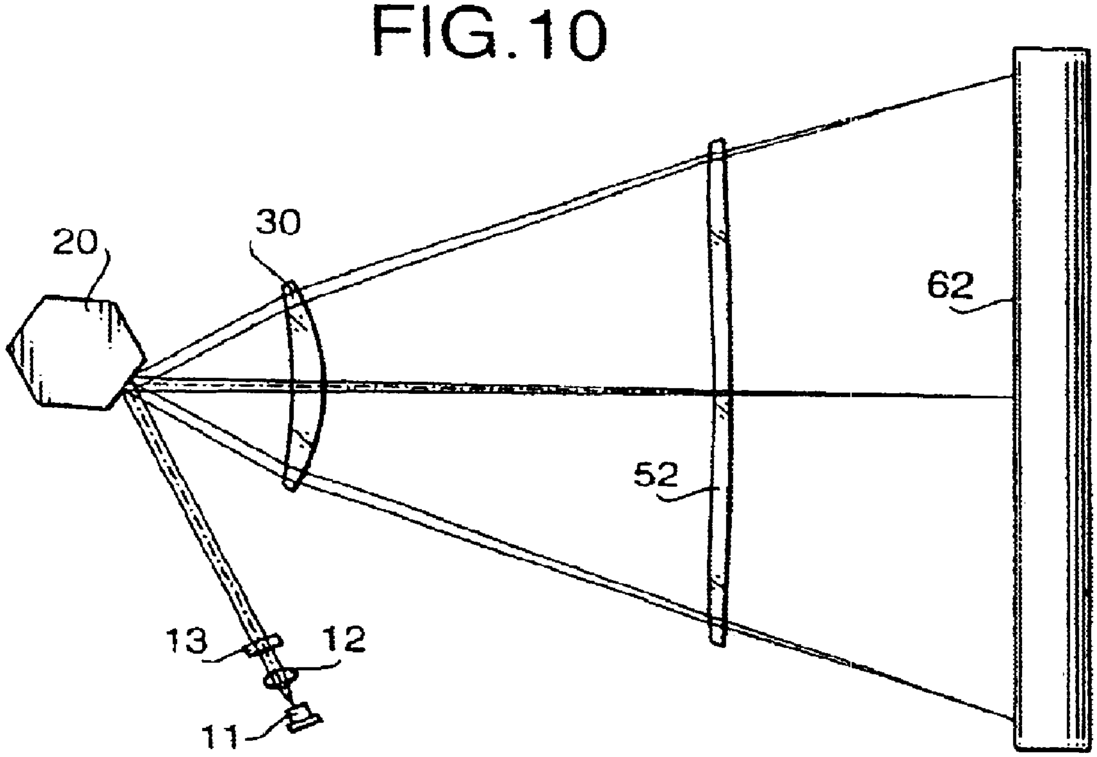
FIG. 10 is a top view of the scanning optical system showing optical system for inner beams according to the third embodiment of the invention.
Figure 11:
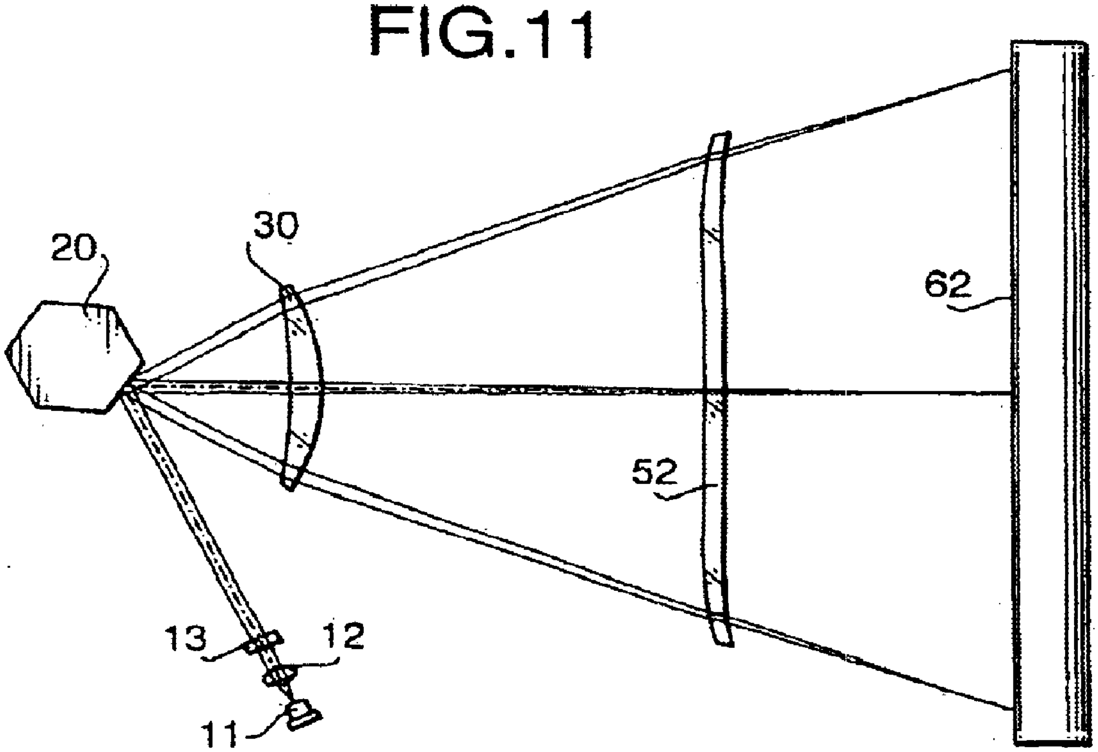
FIG. 11 is a top view of the scanning optical system showing optical system for inner beams according to a comparative example.

FIG. 10 is a top view of the scanning optical system showing optical system for inner beams according to the third embodiment of the invention, and FIG. 11 is a top view of the scanning optical system showing optical system for inner beams according to the comparative example.

It is appreciated from FIGS. 6 and 10, the shapes of the compensation lenses 51 and 52 in the main scanning direction are substantially the same. As is understood by comparing FIGS. 6 and 11, in the comparative example, the shapes of the compensation lenses 51 and 52 in the main scanning direction are different.

Specifically, the compensation lens 52 of the comparative example is configured such that surface #9 is a two-dimensional polynomial aspherical surface and surface #10 is a rotationally symmetrical aspherical surface, numerical data defining these surfaces are indicated in TABLEs 21–23.

TABLE 21

| | | | | | | |
|---|---|---|---|---|---|---|
| 9 | −740.00 | — | 5.00 | 1.48617 | 2.50 | COMPENSATION LENS 52 |
| 10 | −1800.00 | — | 83.38 | | | |
| 11 | ∞ | — | 0.00 | | 2.40 | PHOTOCONDUCTIVE DRUM 62 |

TABLE 22

SURFACE #9
TWO-DIMENSIONAL POLYNOMIAL ASPHERICAL SURFACE
(FOR INNER BEAMS)

| $B_{mn}$ | n = 0 | n = 1 | n = 2 | n = 3 | n = 4 |
|---|---|---|---|---|---|
| m = 0 | — | $3.140 \times 10^{-02}$ | $1.812 \times 10^{-02}$ | $-1.925 \times 10^{-05}$ | $-9.433 \times 10^{-08}$ |
| m = 2 | $-2.988 \times 10^{-05}$ | $-4.514 \times 10^{-07}$ | $-3.584 \times 10^{-07}$ | $4.644 \times 10^{-10}$ | $-3.317 \times 10^{-11}$ |
| m = 4 | $1.147 \times 10^{-07}$ | $-1.103 \times 10^{-10}$ | $9.577 \times 10^{-14}$ | $4.007 \times 10^{-13}$ | $-1.700 \times 10^{-15}$ |
| m = 6 | $5.288 \times 10^{-12}$ | $5.514 \times 10^{-15}$ | $2.545 \times 10^{-15}$ | $1.697 \times 10^{-17}$ | 0.000 |
| m = 8 | $1.917 \times 10^{-17}$ | 0.000 | 0.000 | 0.000 | 0.000 |

TABLE 23

SURFACE #10
ROTATIONALLY SYMMETRICAL ASPHERICAL SURFACE

| | |
|---|---|
| K | 0.00 |
| $A_4$ | 0.00 |
| $A_6$ | $1.00 \times 10^{-11}$ |

Figure 12:
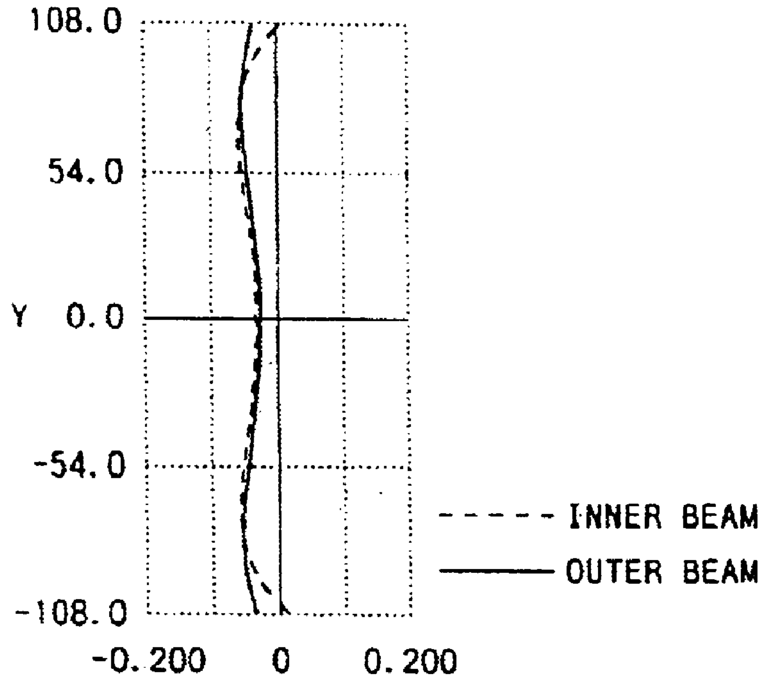
FIG. 12 is a graph showing bows according to the comparative example when a compensation lens is inclined by one degree.

FIG. 12 is a graph showing bows according to the comparative example when each of the compensation lenses 51–54 is rotated by one degree about its rotation axis extending in the main scanning direction. In the graph, solid line represents the bow corresponding to the outer beam L1 and broken line represents the bow corresponding to the inner beam L2. The vertical axis of the graph indicated the scanning position in the main scanning direction (unit: mm) and the horizontal line of the graph indicates the amount of bow (unit: mm). As indicated in FIG. 12, according to the comparative example, the bows generated by the optical system for the outer beam L1 and that for the inner beam are different.

Next, the difference of the SAG amounts between the compensation lenses for the outer and inner beams, and the difference between the bows generated thereby will be described.

Figure 13:
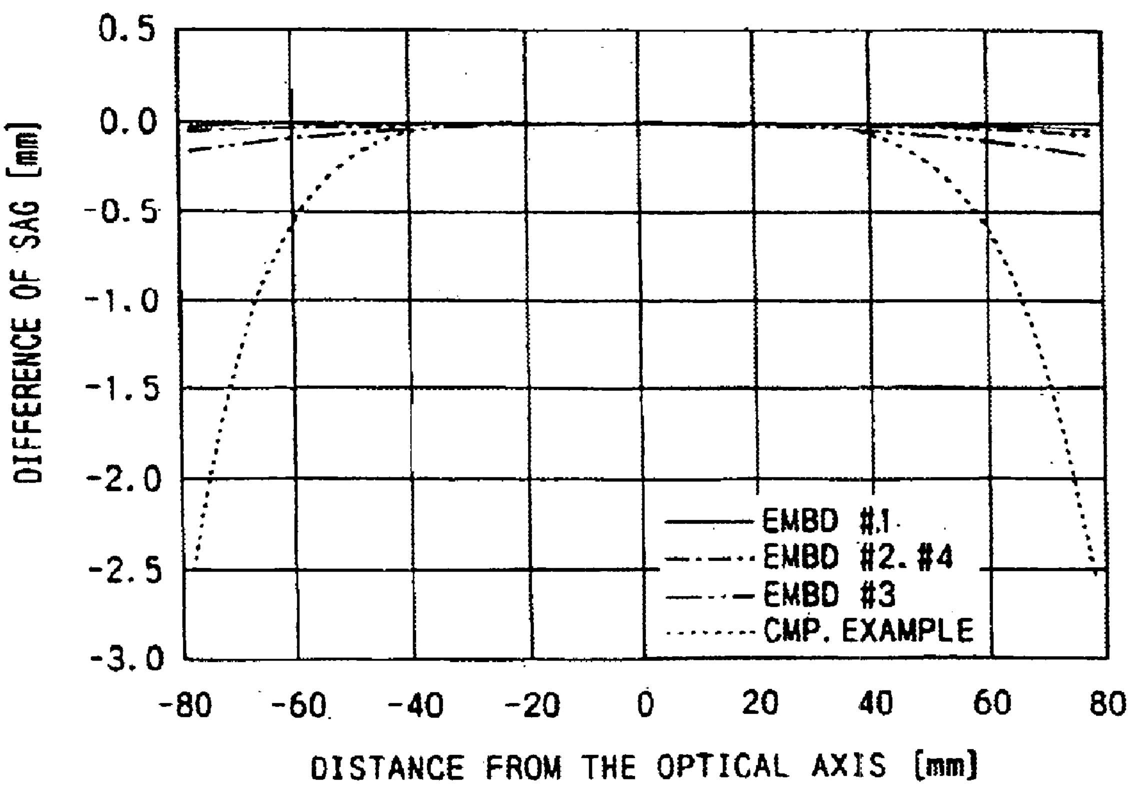
FIG. 13 is a graph showing differences of SAG amounts of compensation lenses for outer and inner beams of each embodiment and the comparative example.
Figure 14:
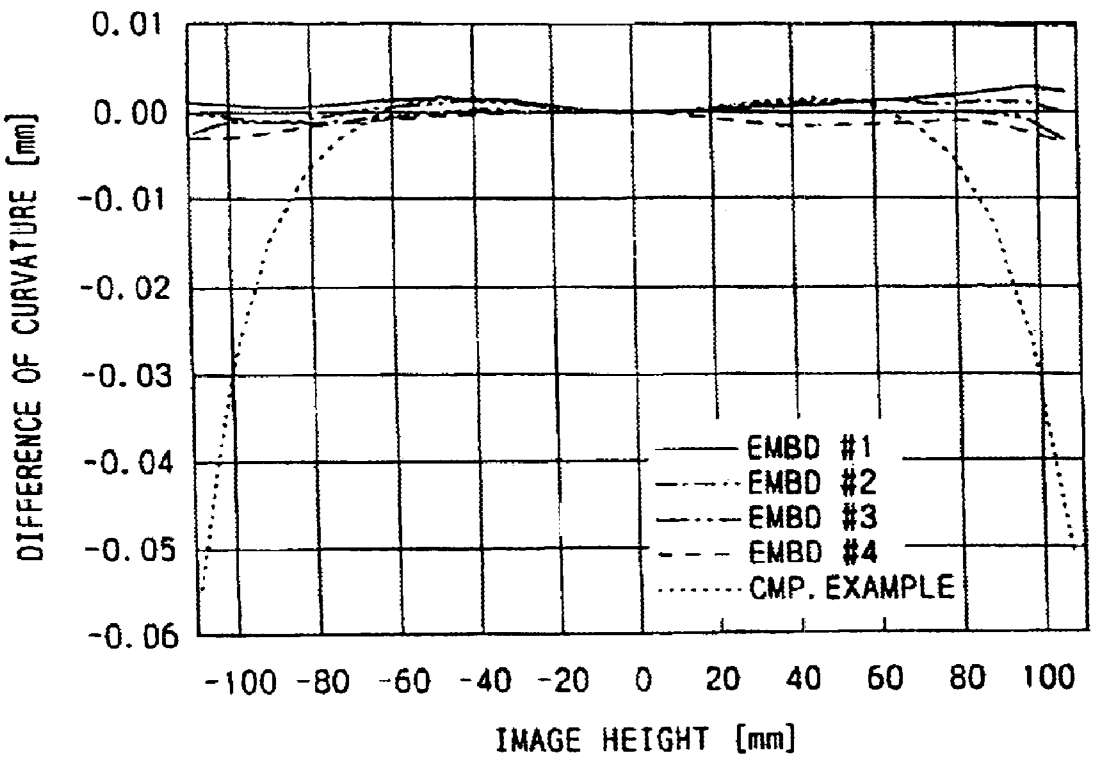
FIG. 14 is a graph showing differences of bows of outer and inner beams of each embodiment and the comparative example.

FIG. 13 is a graph showing differences of the SAG amounts of compensation lenses for outer and inner beams, and FIG. 14 is a graph showing differences of bows of outer and inner beams of each embodiment and the comparative example.

TABLE 24 below indicates the maximum values of the absolute values of the differences of the SAG amounts and the bows.

TABLE 24

| | 1st EMBD. | 2nd EMBD. | 3rd EMBD. | 4th EMBD. | 5th EMBD. |
|---|---|---|---|---|---|
| DIG. OF SAG | 0.0271 | 0.0578 | 0.1620 | 0.0554 | 2.5144 |
| DIG. OF BOW | 0.0028 | 0.0012 | 0.0030 | 0.0035 | 0.0544 |

If the allowance $\Delta p$ is set to 1/10 of the diameter of the beam, when the image resolution is 600 dpi, the condition $|\Delta X_{n-1}(Y)| \leqq 50\Delta p$ is rewritten such that $|\Delta X_{n-1}(Y)| \leqq 0.2$. In each of the first through fourth embodiments, the absolute value of the difference of the SAG amount satisfies this condition. AS a result, the maximum values of the differences of the bows fall within a range of 0.0012 through 0.0035. Therefore, a condition that the 1/10 of the beam size or lower (i.e., 0.00423 mm or lower) is satisfied. Therefore, even if the bows appear due to the assembling error of the lenses or adjustment of lenses, the curved shapes of the scanning lines can be made substantially coincident with each other. Therefore, blur of the image among the color components can be suppressed.

On the contrary, according to the comparative example, the maximum value of the difference of the SAG amounts is 2.5144 mm, which is approximately ten times as large as the upper limit of the condition. As a result, the difference of the bows is 0.0544 mm. Therefore, the scanning lines formed by the outer beams and inner beams shift by an amount greater than the beam diameter. Accordingly, the blur among the color components becomes significant, and the image quality is deteriorated.

The present disclosure relates to the subject matter contained in Japanese Patent Application No. 2000-388364, filed on Dec. 20, 2001, which is expressly incorporated herein by reference in its entirety.

What is claimed is:

1. A scanning optical system, comprising:

a light source that emits a plurality of beams;

a polygonal mirror that deflects the plurality of beams emitted by said light source to scan within a predetermined angular range;

an imaging optical system that converges the plurality of beams on a plurality of surfaces to be scanned, respectively, wherein said imaging optical system includes a scanning lens and a plurality of compensation lenses located between said scanning lens and a plurality of surfaces to be scanned, the plurality of beams passing through said scanning lens, the plurality of beams passed through said scanning lens being incident on said plurality of compensation lenses, respectively, wherein each of said plurality of compensation lenses having an anamorphic surface, shapes of the anamorphic surfaces of said plurality of compensation lenses in a main scanning direction being substantially the same with respect to each other, wherein the anamorphic surface of each of said compensation lenses is asymmetrical with respect to a plane that is perpendicular to an auxiliary scanning direction and includes a center of the anamorphic surface.

2. The scanning optical system according to claim 1, wherein each of said plurality of compensation lenses consists of a single plastic lens.

3. A scanning optical system, comprising:

a light source that emits a plurality of beams;

a polygonal mirror that deflects the plurality of beams emitted by said light source to scan within a predetermined angular range;

an imaging optical system that converges the plurality of beams on a plurality of surfaces to be scanned, respectively, wherein said imaging optical system includes a scanning lens and a plurality of compensation lenses located between said scanning lens and a plurality of surfaces to be scanned, the plurality of beams passing through said scanning lens, the plurality of beams passed through said scanning lens being incident on said plurality of compensation lenses, respectively, wherein each of said plurality of compensation lenses having an anamorphic surface, shapes of the anamorphic surfaces of said plurality of compensation lenses in a main scanning direction being substantially the same with respect to each other, wherein the anamorphic surface formed on said compensation lens is a two-dimensional polynomial aspherical surface expressed by a two-dimensional polynomial which represents a SAG amount with respect to a plane tangential to the anamorphic surface including the center thereof and perpendicular to the optical axis of the scanning lens as a function of distances in the main scanning direction and in the auxiliary scanning direction with respect to the center of the anamorphic surface.

4. The scanning optical system according to claim 3, wherein each of said plurality of compensation lenses consists of a single plastic lens.

5. A scanning optical system, comprising:

a light source that emits a plurality of beams;

a polygonal mirror that deflects the plurality of beams emitted by said light source to scan within a predetermined angular range;

an imaging optical system that converges the plurality of beams on a plurality of surfaces to be scanned, respectively, wherein said imaging optical system includes a scanning lens and a plurality of compensation lenses located between said scanning lens and a plurality of surfaces to be scanned, the plurality of beams passing through said scanning lens, the plurality of beams passed through said scanning lens being incident on said plurality of compensation lenses, respectively, wherein each of said plurality of compensation lenses having an anamorphic surface, shapes of the anamorphic surfaces of said plurality of compensation lenses in a main scanning direction being substantially the same with respect to each other, wherein the anamorphic lens of said compensation lens satisfies a condition (n being an integer greater than one):

$$|\Delta X_{n-1}(Y)| \leqq 50\Delta p,$$

wherein,

X(Y) is a SAG amount at a point located at distance Y in the main scanning direction with respect to the center of the anamorphic surface, $\Delta X_{n-1}(Y)$ is a difference of SAG amounts of compensation lenses having different shapes defined by equation:

$$\Delta X_{n-1}(Y) = X_n(Y) - X_{n-1}(Y), \text{ and}$$

$\Delta p$ is an allowance of the difference of bows between scanning lines on the different surfaces to be scanned.

6. The scanning optical system according to claim 5, wherein each of said plurality of compensation lenses consists of a single plastic lens.

7. A scanning optical system, comprising:

a light source that emits a plurality of beams;

a polygonal mirror that deflects the plurality of beams emitted by said light source to scan within a predetermined angular range;

an imaging optical system that converges the plurality of beams on a plurality of surfaces to be scanned, respectively, wherein said imaging optical system includes a scanning lens and a plurality of compensation lenses located between said scanning lens and a plurality of surfaces to be scanned, the plurality of beams passing through said scanning lens, the plurality of beams passed through said scanning lens being incident on said plurality of compensation lenses, respectively, wherein each of said plurality of compensation lenses having an anamorphic surface, shapes of the anamorphic surfaces of said plurality of compensation lenses in a main scanning direction being substantially the same with respect to each other, wherein the anamorphic lens of said compensation lens satisfies a condition (n being an integer greater than one):

$$|\Delta X_{n-1}(Y)| \leqq 0.2 \text{ (unit: mm)},$$

wherein,

X(Y) is a SAG amount at a point located at distance Y in the main scanning direction with respect to the center of the anamorphic surface, and $\Delta X_{n-1}(Y)$ is a difference of SAG amounts of compensation lenses having different shapes defined by equation:

$$\Delta X_{n-1}(Y) = X_n(Y) - X_{n-1}(Y).$$

8. The scanning optical system according to claim 7, wherein each of said plurality of compensation lenses consists of a single plastic lens.

9. A scanning optical system, comprising:

a light source that emits a plurality of beams;

a polygonal mirror that deflects the plurality of beams emitted by said light source to scan within a predetermined angular range;

an imaging optical system that converges the plurality of beams on a plurality of surfaces to be scanned, respectively, wherein said imaging optical system includes a scanning lens and a plurality of compensation lenses located between said scanning lens and a plurality of surfaces to be scanned, the plurality of beams passing through said scanning lens, the plurality of beams passed through said scanning lens being incident on said plurality of compensation lenses, respectively, wherein each of said plurality of compensation lenses having an anamorphic surface, shapes of the anamorphic surfaces of said plurality of compensation lenses in a main scanning direction being substantially the same with respect to each other, wherein one surface of said scanning lens is formed as an anamorphic aspherical surface whose cross sectional shape in the main scanning direction is defined as a function of a distance from the optical axis of the scanning lens, a cross sectional shape of the anamorphic aspherical surface in the auxiliary scanning direction being an arc whose curvature is defined, independently of the shape in the main scanning direction, as a function of a distance from the optical axis in the main scanning direction.

10. The scanning optical system according to claim 9, wherein each of said plurality of compensation lenses consists of a single plastic lens.

11. The scanning optical system according to claim 9, wherein the plurality of beams are incident, within a plane extending in the auxiliary scanning direction, on said polygonal mirror such that incident angles of the plurality of beams having the same absolute values and different signs, said plurality of compensation lenses being arranged optically symmetrically with respect to a line extending the optical axis of said scanning lens.

* * * * *